United States Patent [19]

Swift

[11] 4,376,889
[45] Mar. 15, 1983

[54] LOW LIGHT LEVEL VISION APPARATUS

[75] Inventor: David W. Swift, Prestatyn, Wales

[73] Assignee: Pilkington P.E. Limited, Helens, England

[21] Appl. No.: 134,470

[22] Filed: Mar. 27, 1980

Related U.S. Application Data

[63] Continuation of Ser. No. 910,699, May 25, 1978, abandoned.

[30] Foreign Application Priority Data

Jun. 4, 1977 [GB] United Kingdom ............... 23822/77

[51] Int. Cl.³ ....................... H01J 31/50; H01J 40/14
[52] U.S. Cl. ........................ 250/213 VT; 250/213 R; 350/437; 350/438; 350/439
[58] Field of Search .................... 250/213 VT, 213 R; 350/437, 438, 439

[56] References Cited

U.S. PATENT DOCUMENTS

| | | | |
|---|---|---|---|
| 2,926,239 | 2/1960 | Skellett | 250/213 R |
| 3,173,012 | 3/1965 | Winter | 350/20 |
| 3,464,757 | 9/1969 | Schmidt et al. | 350/52 |
| 3,633,988 | 1/1972 | Farrar | 350/3.72 |
| 3,868,504 | 2/1975 | Anderson | 250/213 VT |
| 3,915,548 | 10/1975 | Opittek et al. | 350/3.72 |
| 3,971,933 | 7/1976 | Adamson, Jr. | 250/213 VT |

FOREIGN PATENT DOCUMENTS 1001537  8/1965  United Kingdom ................ 350/196

Primary Examiner—S. C. Buczinski
Attorney, Agent, or Firm—Schuyler, Banner, Birch, McKie and Beckett

[57] ABSTRACT

Low light level or night vision apparatus, and particularly goggles, having an objective lens to focus incident light on to an image intensifier and a magnifier enabling an observer to view a magnified version of the intensified image includes a wavelength selective filter with a hole or aperture through which light of other wavelengths can pass, the wavelength selective filter or means associated with the hole or aperture being arranged to have a focussing effect so that light from a distant scene or object of a wavelength passed by the filter can be properly focussed on the image intensifier, and light from a near scene or object passing through the hole or aperture can simultaneously also be properly focussed on the image intensifier, so that either or both images can be viewed in a focussed condition without adjustment of the apparatus.

28 Claims, 5 Drawing Figures

LOW LIGHT LEVEL VISION APPARATUS

This is a continuation of application Ser. No. 910,699, filed May 25, 1978, now abandoned.

BACKGROUND OF THE INVENTION

This invention concerns improvements in or relating to optical apparatus and relates more particularly to low light level or night vision apparatus and especially, but not exclusively, night vision goggles.

Night vision goggles, in which incident light at a low level is intensified to produce a visible image of a viewed scene or object and the image is seen by both eyes of a binocular observer, can be used for example by the pilot of a helicopter or other aircraft. In such mode of use the problem is encountered that the objective lens of the goggles is focussed at infinity for normal flying, and if the pilot looks down at his instruments, which are generally at a distance of about 0.5 to 1 meter away, they will appear blurred and out of focus. The effect is usually very marked because of the large diameter of the goggles relative to the eye. Manual refocussing can be employed but this is inconvenient and slow.

SUMMARY

According to the present invention there is provided optical apparatus for low light level or night vision use comprising an objective lens arranged to focus incident light on to image intensifier means, means enabling an observer to view a magnified version of an image produced by the image intensifier means, a wavelength selective filter (sometimes referred to later as a main filter) disposed in the light path to the image intensifier means, and arranged to transmit light over a selected wavelength band or bands along a first optical path, the filter having a hole or aperture therein through which light of other wavelengths can pass along a second optical path, wherein the filter is, or means associated with the hole or aperture in the filter are, arranged to have a focussing effect on light passing through the filter, or on light passing through the hole or aperture.

With such an arrangement light from a distant scene or object of wavelengths within said selected band or bands can be transmitted through the filter and properly focussed by the objective lens on to the image intensifier means, and light from a near scene or object passing through the hole or aperture in the filter can also be properly focussed by the objective lens on to the image intensifier means. An observer can therefore see a properly focussed image of either the distant scene or object or the near scene or object, or both, without having to adjust the apparatus.

In one embodiment in accordance with the invention the filter has the form of a negatively powered lens element, e.g. is plano-concave, and the hole or aperture therein may either be unoccupied or may have a plane window in it. With this embodiment the objective lens is arranged to focus light from a near scene or object on to the image intensifier means. Thus light from such near scene or object passing through the hole or aperture is properly focussed on to the image intensifier means. Light from a distant scene or object passing through the filter is also properly focussed by the objective lens on to the image intensifier means due to the focussing effect of the negative lens element filter form which presents such light to the objective lens as if it were coming from a near scene or object.

If desired a bandpass filter may be located in or adjacent the hole or aperture in the main filter, the bandpass filter transmitting light in a wavelength band not transmitted by the main filter. Alternatively or additionally means may be provided to illuminate a near scene or object with light in the wavelength band not transmitted by the main filter. The main filter may be such as to transmit all available light except for one narrow spectral band, or may be such as to transmit light above but not below a particular wavelength region or vice versa. Conveniently the main filter is a "minus blue" or "yellow" filter.

In another embodiment in accordance with the invention the main filter has plane parallel major faces and a focus correction lens (as well as, if desired, a bandpass filter) is located in the hole or aperture. With this arrangement the objective lens is arranged to focus incident light from a distant scene or object, i.e. effectively from infinity, on to the image intensifier means, such light passing effectively undeviated through the main filter. Light from a near scene or object passing through the hole or aperture in the main filter is also properly focussed by the objective lens on to the image intensifier means due to the effect of the focus correction lens which presents such light to the objective lens as if it were coming from a distant scene or object.

In a further embodiment in accordance with the invention holograms are employed to serve the function of the focus correction lens in the last mentioned embodiment. Specifically, one hologram is located in or adjacent the hole or aperture in the planar main filter (together with, if desired, a bandpass filter), and a further hologram is located to direct light to said one hologram. The use of two holograms enables cancellation of chromatic dispersion and anamorphic distortion.

The invention is particularly applicable to biocular viewing apparatus and especially night vision goggles having a single objective lens and image intensifier means which is observed through a magnifier by both eyes.

BRIEF DESCRIPTION OF THE DRAWINGS

Apparatus in accordance with the invention will now be described, by way of example, with reference to the accompanying drawings in which.

DESCRIPTION OF THE PREFERRED EMBODIMENTS

Figure 1:
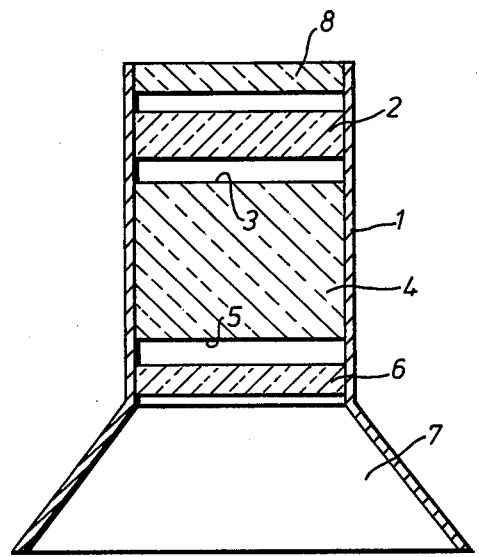
FIG. 1 is a schematic representation of an embodiment of night vision goggles.

FIG. 1 schematically shows night vision goggles comprising a housing 1 containing an objective lens 2 which focusses incident light on to the photocathode 3 of an image intensifier tube 4. An intensified image of a viewed scene or object is produced in known manner on the phosphor 5 of the tube 4. Such image is viewed biocularly by an observer via a collimating magnifier lens 6 and an eye-piece arrangement 7. In front of the objective lens 2 there is provided, in accordance with the invention, a filter arrangement 8.

Figure 2:
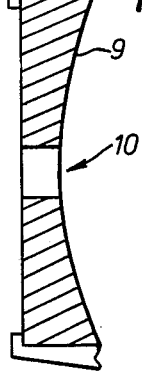
FIGS. 2, 3 and 4 are schematic representations of alternative embodiments of filter arrangements for use in the goggles of FIG. 1.

One embodiment of such filter arrangement 8 is shown in FIG. 2. It comprises a filter 9 having the form of a plano-concave negatively powered lens element. A hole or aperture 10 is provided centrally through the filter 9. Such hole or aperture may be occupied by a plane window.

The filter 9 is of a material which transmits light only of a selected wavelength band or bands. It may be such as to transmit all available light in the circumstances of use except for one narrow spectral band. However, in practice, it may transmit light above but not below a particular wavelength region or vice versa and may conveniently be a "minus blue" or "yellow" filter having for example virtually 100% transmittance at wavelengths above about 550 nm and virtually zero transmittance at wavelengths below about 450 nm. The hole or aperture 10 of course transmits light of all wavelengths including in particular the spectral band rejected by the filter 9.

The negatively powered lens shape of the filter 9 has a focussing effect on light from a distant scene or object, i.e. effectively from infinity, such that this light is presented to the objective lens 2 as if it were coming from a near scene or object, for example at a distance of 0.5 or 1 meter. The objective lens 2 is arranged to focus light from such near scene or object on to the photocathode 3. In other words, the filter 9 effectively "corrects" the focus of the near focus objective lens 2 to infinity. In this way proper focussing of light from a distant scene or object over the wavelengths passed by the filter 9 is achieved to produce a satisfactory image on the photocathode 3.

Light from a near scene or object passing undeviated through the hole or aperture 10 in the filter 9 is also properly focussed by the objective lens 2 to produce a satisfactory image on the photocathode 3 (such near scene or object being at the actual near focus of the objective lens 2). Preferably light from the near scene or object passing through the hole or aperture 10 is restricted to wavelengths within the spectral band rejected by the filter 9 in order to avoid "flooding" of the image produced with unfocussed light of other wavelengths passed by the filter 9. This can be achieved by illuminating the near scene or object with light restricted to the spectral band, or alternatively or additionally by locating a suitable bandpass filter in or adjacent the hole or aperture 10.

Figure 3:
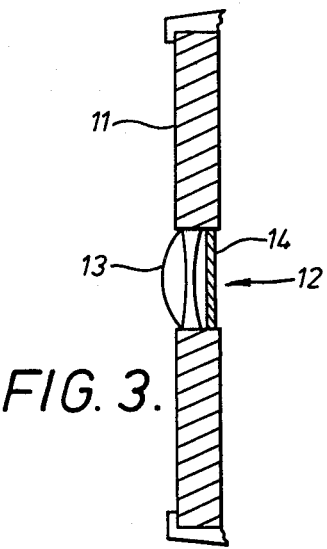

Another embodiment of filter arrangement 8 is shown in FIG. 3. This comprises a wavelength selective filter 11 in the form of a plate having planar parallel major faces. The filter 11 has a central hole or aperture 12 in which is located a positive power focus correction lens 13 and a bandpass filter 14.

With this embodiment the objective lens 2 is arranged to focus incident light from a distant scene or object, i.e. effectively from infinity, on to the photocathode 3. Thus such light within the wavelength band or bands transmitted by the filter 11 passes therethrough undeviated and is focussed by the objective lens to form a satisfactory image on the photocathode. Light from a near scene or object and of a wavelength within the spectral band passed by the bandpass filter 14 is transmitted through the hole or aperture 12. Due to the focussing effect of the lens 13, such light is presented to the objective lens 2 effectively as if it came from a distant scene or object and is therefore properly focussed by the objective lens to produce a satisfactory image on the photocathode 3. In other words the lens 13 effectively "corrects" the actual far focus of the objective lens 2 to a near focus. The lens 13 may, but need not necessarily, be a doublet which provides the necessary positive power (for example about 1.4 dioptres) for such focus "correction", and also corrects chromatic aberration of the objective lens 2 for the spectral band passed by the bandpass filter 14. Conveniently this is the blue end of the spectrum, the main filter 11 being a "minus blue" or "yellow" filter.

Figure 4:
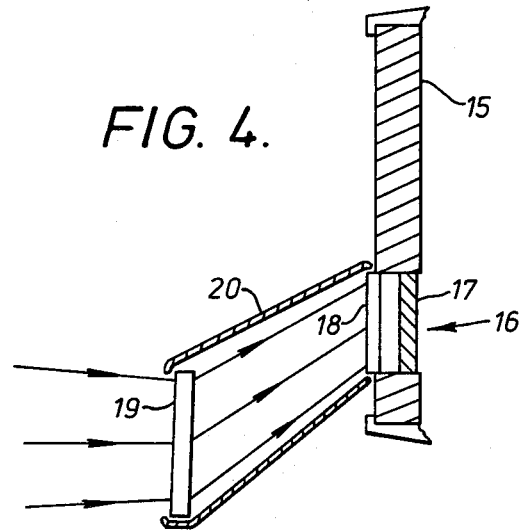

A further embodiment of filter arrangement 8 is shown in FIG. 4. This embodiment has a wavelength selective filter 15 in the form of a plate with plane parallel major faces. The filter 15 has a hole or aperture 16 containing an optional bandpass filter 17. A first hologram 18 is located in or adjacent the hole or aperture 16 and a second hologram 19 is mounted in front of the first. The holograms 18 and 19 are preferably disposed perpendicular to the axis but may be inclined thereto and mutually parallel or near-parallel. The hologram 19 is carried by a mounting 20 which also serves as a baffle preventing incident light not from the hologram 19 reaching the hole or aperture 16.

The use of two holograms 19 and 18 cancels chromatic dispersion and anamorphic distortion and they can, for purposes of explanation, be considered as an off-axis holographic lens (equivalent to a lens and a prism) and a holographic prism. In practice, however, aberrations are preferably minimised by distributing the lens power between the two holograms.

The operation of the FIG. 4 embodiment is essentially similar to that of FIG. 3 but the focus and other corrections are effected holographically. Thus the objective lens 2 is arranged to focus incident light from a distant scene or object on to the photocathode 3, such light in the wavelength band(s) transmitted by the filter 15 passing therethrough undeviated to the objective lens. The holograms 19 and 18 effectively "correct" the actual far focus of the objective lens 2 to a near focus in respect of light from a near scene or object of a wavelength within the spectral band transmitted by the bandpass filter 17 so that such light is also properly focussed on to the photocathode 3 to form a satisfactory image. With the holographic arrangement light from the near scene or object passing through the holographic channel should be within a narrow spectral band, typically with a bandwidth of 40 nm or less, and this can be achieved by placing a suitable narrow band filter adjacent the source.

In the embodiments of FIGS. 2 and 3 the hole or aperture is located centrally in the main filter. This on-axis disposition is optically preferable with these arrangements. In the FIG. 4 embodiment the hole or aperture 16 is not central of the filter 15 but is at an off-axis disposition to reduce the obscuration of the main light path by the hologram 19 and its mounting 20. As previously mentioned, the mounting 20 provides a baffle which prevents light which does not pass through the hologram reaching the hole or aperture 16. However, the effective size of the holographic channel aperture can be made sufficiently small to produce only insignificant degradation of the main view.

In an alternative holographic embodiment the two holograms may be placed close together, but separated by a louvre structure which has the function of blocking the direct light but transmitting the wanted holographically diffracted light.

The bandpass filter is preferably just complementary to the main filter, and in particular transmits wavelengths below approximately 450 nm. This part of the spectrum is not substantially transmitted by a "minus blue" or "yellow" main filter and lies near the sensitivity peak of a particular photocathode commonly used in image intensifier tubes known as S25. Further, although the objective lens 2 may not be well corrected for this passband, the aberration introduced as a result need not be significant because of the relatively small aperture of the passband channel and the small spectral bandwidth. Some aberration correction can be effected by the lens 13 in the FIG. 3 embodiment and the hologram can be constructed to correct Seidel aberrations, at least on axis, in the FIG. 4 embodiment.

An illuminant operating at between 350 and 500 nm can be employed for the near scene or object, and can be provided by an incandescent lamp behind a passband interference filter or by using the 435.8 nm Hg line filtered from a mercury discharge lamp. As previously indicated in relation to the FIG. 2 embodiment, it is not absolutely essential to include a bandpass filter in the hole or aperture in the main filter, and light passing through this hole or aperture could be restricted to the required spectral band solely by control of the illumination of the near scene or object under view. The presence of a bandpass filter is, however, preferable to reduce acceptance of defocussed light from elsewhere.

Figure 5:
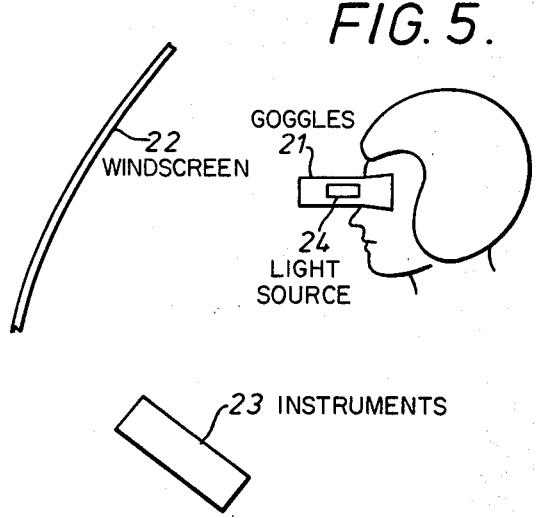
FIG. 5 is a schematic representation of an aircraft pilot wearing the goggles of FIG. 1 further showing parts of the aircraft.

FIG. 5 schematically illustrates a helicopter, or other aircraft pilot, wearing night vision goggles 21 as described above. His usual line of sight provides an external view through the windscreen 22 and he sees with both eyes a focussed image of the distant scene or objects by means of light transmitted through the main filter of the goggles. When he looks down at his instruments 23 (which represent a near scene or object) he can see a focussed image of them by means of light transmitted through the hole or aperture in the main filter. Illumination of the instruments with light within the required spectral band may conveniently be effected by means of a suitable source 24 mounted on the goggles or on the pilot's helmet.

It will be appreciated that, although specifically described above in relation to night vision goggles for a helicopter or other aircraft pilot, the invention can also find application to other uses requiring distant and close vision under night or other low light level conditions. A further example is road vehicle driving and map reading.

It will further be appreciated that the particular wavelength selection employing a "minus blue" or "yellow" main filter and the unused blue end of the spectrum for the near vision channel specifically indicated above is given by way of illustration and example. The wavelength selection could be on a different basis and, as a further example, could employ light at the infra-red end of the spectrum for the near vision channel.

It will further be appreciated that the filter and focussing arrangement 8 described above and shown located in front of the objective lens 2 could instead be disposed in the light path between the objective lens 2 and the photocathode 3 of the image intensifier tube 4, and could in particular be located at the stop of the objective lens 2.

I claim:

1. Optical apparatus for low light level or night vision use to enable in-focus viewing of two different objects or scenes at different distances from the apparatus, comprising:
    image intensifier means for producing an intensified image of said objects or scenes for viewing through the apparatus;
    viewing means for enabling an observer to view a magnified version of the image produced by said image intensifier means; and
    filter and focussing means disposed in the light path between said objects or scenes and said image intensifier means for transmitting filtered and focussed light from said objects or scenes to said image intensifier means, said filter and focussing means comprising:
    an objective lens disposed in said light path for focussing light from one of said objects or scenes on said image intensifier means;
    a wavelength selective filter disposed in said light path for transmitting therethrough along a first optical path incident light of a selected wavelength band or bands, said filter having a hole therein through which incident light of other wavelengths can pass along a second optical path; and
    focus correction means arranged to act only on light passing along one of said two optical paths and cooperative with said objective lens to focus on said image intensifier means the light from the other of said objects or scenes which passes along said one optical path, while light of said other wavelengths from said one object or scene which passes along the other of said optical paths is focussed on said image intensifier means by said objective lens without the aid of said focus correction means,
    whereby in-focus images of the two objects or scenes at different distances from the apparatus are presented for viewing by the observer.

2. Apparatus according to claim 1 wherein said wavelength selective filter is adapted to have a focussing effect on light passing through the filter.

3. Apparatus according to claim 1 wherein said filter and focussing means comprises means associated with the hole in said wavelength selective filter and arranged to have a focussing effect on light passing through the hole.

4. Apparatus according to claim 2 wherein the filter has the form of a negatively powered lens element.

5. Apparatus according to claim 4 wherein the filter is plano-concave.

6. Apparatus according to claim 1 wherein said wavelength selective filter provides a main filter and a bandpass filter is located in or adjacent the hole in the main filter, the bandpass filter transmitting light in a wavelength band not transmitted by the main filter.

7. Apparatus according to claim 1 comprising means to illuminate a near scene or object with light in a wavelength band not transmitted by said wavelength selective filter.

8. Apparatus according to claim 1 wherein said wavelength selective filter is a minus blue or yellow filter.

9. Apparatus according to claim 3 wherein said wavelength selective filter has plane parallel major faces and focus correction means are located in or adjacent the hole.

10. Apparatus according to claim 9 wherein said focus correction means comprise a focus correction lens.

11. Apparatus according to claim 9 wherein said focus correction means comprise holograms.

12. Apparatus according to claim 11 comprising one hologram located in or adjacent the hole and a further hologram located to direct light to said one hologram.

13. Biocular viewing apparatus according to claim 1 having a single objective lens and image intensifier means which can be observed through a magnifier by both eyes of an observer.

14. Apparatus according to claim 13 in the form of night vision goggles.

15. Apparatus according to claim 1 wherein said focus correction means is arranged to present light from one of said objects or scenes to said objective lens as though the light were coming from the distance at which the other of said objects or scenes is located from the apparatus.

16. Apparatus according to claim 1 wherein said wavelength selective filter transmits light substantially at the infra-red end of the visible spectrum.

17. Apparatus according to claim 1 wherein said two objects or scenes are located at substantially different distances from the apparatus.

18. Apparatus according to claim 17 wherein one object or scene is located relatively close to the apparatus, and the other object or scene is located substantially beyond said one object or scene.

19. Apparatus according to claim 18 wherein the near object or scene is located on the order of 0.5 to 1.0 meter from the apparatus.

20. Apparatus according to claim 18 for use by an occupant of a vehicle, wherein the near object or scene is located within the vehicle and the distant object or scene is located outside of the vehicle.

21. Apparatus according to claim 20 wherein the near object or scene is located on the order of 0.5 to 1.0 meter from the apparatus.

22. A method of producing under low light level or night vision conditions in-focus images of two different objects or scenes located at different distances from a viewing apparatus, comprising the steps of:

passing incident light through a wavelength selective filter and transmitting light of wavelengths passed by the filter to an image intensifier;

focussing onto the image intensifier light being passed by the filter from an object or scene at one distance;

passing incident light of other wavelengths through a hole in the filter and transmitting that light to the image intensifier;

focussing onto the image intensifier light of said other wavelengths which passes through the hole in the filter from the other object or scene at another distance;

producing by means of the image intensifier an intensified image of the object or scene from which light is focussed onto the image intensifier; and magnifying the intensified image for viewing by an observer.

23. A method according to claim 22 wherein the two objects or scenes are located at substantially different distances from the apparatus.

24. A method according to claim 23 wherein one object or scene is located relatively close to the apparatus, and the other object or scene is located substantially beyond said one object or scene.

25. A method according to claim 24 wherein the near object or scene is located on the order of 0.5 1 to 1.0 meter from the apparatus.

26. A method according to claim 24 wherein the observer is an occupant of a vehicle, the near scene or object is located within the vehicle and the distant scene or object is located outside of the vehicle.

27. A method according to claim 26 wherein the near object or scene is located on the order of 0.5 to 1.0 meter from the apparatus.

28. A method according to claim 22 wherein said wavelength selective filter transmits light substantially at the infra-red end of the visible spectrum.

* * * * *